United States Patent
Lee et al.

(10) Patent No.: US 8,187,566 B2
(45) Date of Patent: *May 29, 2012

(54) CONTINUOUS METHOD AND APPARATUS OF FUNCTIONALIZING CARBON NANOTUBE

(75) Inventors: Jin Seo Lee, Daejeon (KR); Joo Hee Han, Daejeon (KR); Seung-Hoe Do, Daejeon (KR); Seong Cheol Hong, Daejeon (KR)

(73) Assignee: Hanwha Chemical Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/453,947

(22) Filed: May 28, 2009

(65) Prior Publication Data
US 2009/0297424 A1    Dec. 3, 2009

(30) Foreign Application Priority Data
May 29, 2008  (KR) .................. 10-2008-0050048

(51) Int. Cl.
*C01B 31/04* (2006.01)
*D01F 9/12* (2006.01)
(52) U.S. Cl. ............... 423/447.8; 423/447.1; 423/447.3; 977/843; 977/847
(58) Field of Classification Search .... 423/447.1–447.3, 423/445 B; 977/742–754, 842–848; 428/367
See application file for complete search history.

(56) References Cited

U.S. PATENT DOCUMENTS
7,998,450 B2 * 8/2011 Han et al. .................. 423/447.8
2006/0097228 A1   5/2006 Lee et al.
2006/0239891 A1 * 10/2006 Niu et al. .................. 423/445 R

FOREIGN PATENT DOCUMENTS
| JP | 2005-263607 | 9/2005 |
| KR | 2001-0102598 | 11/2001 |
| KR | 10-0450029 | 9/2004 |
| KR | 10-2006-0044194 | 11/2004 |
| KR | 10-2005-0009711 | 1/2005 |
| KR | 10-2007-0114553 | 12/2007 |

OTHER PUBLICATIONS

Park, et al., Progressive and invasive functionalization of carbon nanotube sidewalls by diluted nitric acid under supercritical conditions, J. Mater. Chem. 2005; 15: 407-411.*
Tasis, Dimitrios et al., "Chemistry of Carbon Nanotubes" (2005) *Chem Rev.*, 106, 1105-1136.
Ki Chul Park et al., "Progressive and invasive . . . supercritical conditions", Journal of Materials Chemistry, 2005, vol. 15, pp. 407-411.

* cited by examiner

*Primary Examiner* — Daniel C. McCracken
(74) *Attorney, Agent, or Firm* — Clark & Brody

(57) ABSTRACT

The present invention relates to a continuous method for functionalizing a carbon nanotube, and more specifically, to a continuous method for functionalizing a carbon nanotube by feeding functional compounds having one or more functional group into a functionalizing reactor into which a carbon nanotube mixture including oxidizer is fed under a pressure of 50 to 400 atm and a temperature of 100 to 600° C. to a subcritical water or supercritical water condition of a pressure of 50 to 40 atm by using a continuously functionalizing apparatus to obtain the functionalized products, such that the functional group of the functional compound can be easily introduced to the carbon nanotube, thereby increasing the functionalized effect of the carbon nanotube and increasing the dispersibility accordingly.

7 Claims, 7 Drawing Sheets

CONTINUOUS METHOD AND APPARATUS OF FUNCTIONALIZING CARBON NANOTUBE

TECHNICAL FIELD

The present invention relates to a continuous method for functionalizing a carbon nanotube, and more specifically, to a continuous method for functionalizing a carbon nanotube by feeding functional compounds under a subcritical water or supercritical water condition.

BACKGROUND ART

A structure of a carbon nanotube (hereinafter, referred to as CNT) was first found in 1991. Synthesis, physical property, and application of the carbon nanotube have been actively studied. Also, it has been confirmed that the CNT is produced by adding transition metals, such as ferrum (Fe), nickel (Ni), cobalt (Co), etc., at the time of discharging electricity. A full study started from a preparation of a significant amount of samples by a laser evaporation method in 1996. The CNT takes a form of a round wound hollow tube whose graphite surface is a diameter of a nano size. At this time, the CNT has electrical characteristics, such as conductor, semiconductor, etc., according to the wound angle and structure of the graphite surface. Moreover, the CNT is divided into a single-walled carbon nanotube (SWCNT), a double-walled carbon nanotube (DWCNT), a thin multi-walled carbon nanotube, a multi-walled carbon nanotube (MWCNT), and a roped carbon nanotube according to the number of graphite walls.

In particular, the CNT has excellent mechanical strength or elastic strength, chemical stability, eco-friendliness, and electrical conductor and semiconductor property as well as has an aspect ratio larger than the existing any materials, wherein the aspect ratio reaches about 1,000 as a diameter of 1 nm to several tens nm and a length of several $\mu$m to several tens $\mu$m. Also, the CNT has a very large specific-surface area. As a result, the CNT is being interested as advanced new materials, which will lead the twenty-first century, in the field of next-generation information electronic materials, high-efficiency energy materials, high-functional complex materials, eco-friendly materials, and the like.

However, in spite of various advantages owned by the CNT, since the CNT has very large agglomeration phenomenon and very large hydrophobic property, the CNT is very poor in terms of the mixed property with other media as well as does not have solubility to organic solvents in addition to water Therefore, in order to expand the applications of the CNT while having the advantages of the CNT, a method capable of increasing compatibility with various media and making dispersion efficiency good is needed As a technology of increasing the compatibility of CNT, there is a functional group substituting technology capable of providing separate characteristics on a surface, for example, there are a method for increasing the specific-surface area of CNT using strong bases such as potassium hydroxide, sodium hydroxide, etc., under vacuum and inert gas atmosphere as described in KR Patent No. 450,029, a method for functionalizing a CNT using strong acids or strong bases as described in KR Patent Publication Nos. 2001-102598, 2005-9711, and 2007-114553, and a method of providing a functional group through a process of several steps using organic/inorganic compounds simultaneously with using strong acids or strong bases as described in Chem. Rev, 2006, 106, 1105-1136 as a reference document.

However, since the above technologies use strong acids, such as nitric acid, sulfuric acid, etc., or strong bases, such as potassium hydroxide, sodium hydroxide, etc., they are harmful to environment, are not easy to handle, and can cause the corrosion of a reactor. Further, since the above technologies use organic/inorganic materials, a large amount of harmful wastes can occur. In addition, since they have long reaction time and limited throughput such as subjecting to several reaction steps, the efficiency is low and in order to provide the functional group in addition to oxygen on the surface, they need separate processes, such that much cost and time are consumed.

DISCLOSURE OF THE INVENTION

In order to solve the above problems, it is an object of the present invention to provide a continuous method for functionalizing a carbon nanotube by continuously feeding functional compounds under a subcritical water or supercritical water condition by using a continuous apparatus without a separate functionalizing process.

In order to achieve the above object, there is provided a continuous method for functionalizing a carbon nanotube, comprising: feeding a functional compound having one or more functional group into a functionalizing reactor under a subcritical water or supercritical water condition of 50 to 400 atm, into which a carbon nanotube mixture including oxidizer is fed, under a pressure of 50 to 400 atm and a temperature of 100 to 600° C. to obtain functionalized products.

Further, there is provided a continuous apparatus for functionalizing a carbon nanotube, comprising: a preheater into which a carbon nanotube mixture including oxidizer is fed under a pressure of 50 to 400 atm; a functionalizing reactor into which a functional compound having one or more functional group is fed under a pressure of 50 to 400 atm and a temperature of 100 to 600° C. to a subcritical water or supercritical water condition of 50 to 400 atm in functionalizing the mixture obtained in the preheater; a cooling and depressurizing part that cools down the functionalized product obtained in the functionalizing reactor into 0 to 100° C. and depressurizes them into 1 to 10 atm; and a product storing part that recovers the products obtained in the cooling and depressurizing part.

Further, the present invention provides a continuously functionalized carbon nanotube according to the above-mentioned method.

Hereinafter, one exemplary example of the present invention will be described in detail with reference to the accompanying drawings. First, it is to be noted that like components or parts are denoted by like reference numerals throughout the drawings. In describing the present invention, a detailed description of related known functions or configurations will be omitted so as not to obscure the subject of the present invention Terms used in the specification, "about", "substantially", etc., which represents a degree, are used as meanings at numerical values or approaching the numerical values when inherent tolerances of preparation and material are presented to the above-mentioned meanings and they are used to prevent unconscientious invaders from unfairly using the contents in which accurate or absolute numerical values are disclosed in order to help the understandings of the present invention, are disclosed FIG. 1 is a diagram showing a continuous process for functionalizing a carbon nanotube according to an exemplary example of the present invention. Referring to FIG. 1, the present invention provides a continuous method for functionalizing a carbon nanotube including: a) preheating (S100); b) functionalizing (S200); feeding functional compounds (S210); c) cooling down and depressurizing (S300); and d) product recovering (S400) and may further include e) filtering (S310) that filters the functionalized products after the cooling down in the step c), and f) dispersing (S410) that disperses the products obtained in the step d)

FIG. 2 is a process diagram of a continuous apparatus for functionalizing a carbon nanotube according to an exemplary example of the present invention. Referring to FIG. 2, the continuous apparatus for functionalizing a carbon nanotube of the present invention may include a preheater 110, a functionalizing reactor 130, a cooling down and depressurizing part 150, and a product storing part 170.

The present invention provides a continuous method for functionalizing a carbon nanotube including feeding a functional compound having one or more functional group into a functionalizing reactor under a subcritical water or supercritical water condition of 50 to 400 atm, into which a carbon nanotube mixture including oxidizer is fed, under a pressure of 50 to 400 atm and a temperature of 100 to 600° C. by using the continuous functionalizing apparatus of FIG. 2 to obtain a functionalized product. The carbon nanotube mixture including the oxidizer is formed by feeding the oxidizer and contacting the carbon nanotube solution into the preheater while the carbon nanotube solution including carbon nanotube and solvent are fed at the front end of the functionalizing reactor and preheating it to a temperature of 200 to 370° C.

Describing in more detail, the preheating (S100) feeds the carbon nanotube (CNT) solution including carbon nanotube and solvent and the oxidizer into the preheater 110 under a pressure of 50 to 400 atm to preheat the carbon nanotube mixing solution.

The carbon nanotube and solvent is fed into a pre-treating part 10 before the mixture of oxidizer and carbon nanotube is prepared, thereby making it possible to prepare the CNT solution by the circulation pump 11. The solvent included in the CNT solution can be selected from a group consisting of water, aliphatic alcohol of C1 to C20, carbon dioxide, and a mixture thereof.

Preferably, the CNT is selected from a group consisting of single-walled, double-walled, thin multi-walled, multi-walled, roped, and a mixture thereof and is used.

Further, the CNT can be prepared as 0.0001 to 10 wt % in the CNT solution and more preferably, can be prepared as 0.001 to 3 wt %. If the CNT is below 0.0001 wt %, the recovered amount of CNT is too small. If the CNT is above 10 wt %, the viscosity of the CNT solution is increased, such that it is difficult to feed the CNT solution at high pressure.

In the process of feeding the prepared CNT solution to the preheater 110 under a pressure of 50 to 400 atm using a high-pressure feeding pump 12, the CNT solution contacts oxidizer being fed by oxidizer high-pressure feeding pump 13 under a pressure of 50 to 400 atm, the CNT solution and the oxidizer are mixed at the front end of a heat exchanger 14, are fed into the preheater 110, and the mixture thereof is preheated to a temperature of 100 to 370° C.

When the CNT solution and oxidizer are fed using the high-pressure feeding pump, if the pressure is below 50 atm, it is difficult to feed the CNT solution and the oxidizer into the preheater 110 and the reactor and if the pressure is above 400 atm, energy loss occurs due to too high pressure, such that the functionalized degree in view of functionalizing the CNT is not improved any more.

There is provided the continuous method for functionalizing a carbon nanotube, wherein the carbon nanotube solution further includes nitro compound of Chemical Formula 1.

[Chemical Formula 1]

wherein Chemical Formula 1, R is alkyl group of C1 to C7 or aryl group of C6 to C20 and x and y are integers of 1 to 3 independently. More preferably, the nitro compound is nitro methane, nitro ethane, or nitro propane.

The nitro compound is included at a molar ratio of 0.0001 to 1 with respect to the CNT in the carbon nanotube solution. If the nitro compound is below 0.001 molar ratio, an oxidation effect is deteriorated at the time of functionalizing the carbon nanotube, such that the effect feeding the functional group of the functional compound is not large and there is a risk that the dispersibility is not improved. If the nitro compound is above 1 molar ratio, the functionalizing effect corresponding to the exceeded molar ratio is not obtained, such that raw materials waste.

The preheater 110 previously preheats the mixture before the mixture is functionalized under the subcritical water or supercritical water condition to be described below to uniformly maintain the temperature of the reactor 130.

Therefore, the front end of the preheater 100 is installed with the heat exchanger 14 that performs a role of preheating the mixture of the CNT solution and the oxidizer. The heat exchanger 14 primarily drops temperature before finally cooling down the functionalized products under the subcritical water or supercritical water condition to be described below to perform a role of preventing energy loss consumed at the time of cooling later. If the temperature is below 100° C., the temperature should be more raised at the critical condition, such that there is no effect of preventing energy loss. If the temperature is above 370° C., energy loss consumed to raise the temperature above the temperature necessary to obtain the preheating effect is rather increased, such that the installation effect of the heat exchanger disappears.

Meanwhile, the oxidizer can be selected from oxygen, air, ozone, hydrogen peroxide, nitro compound, nitric acid forming oxidizer, and a mixture thereof and may be included at 0.001 to 10 equivalents in proportional to carbon equivalent of CNT in the carbon nanotube mixture. The CNT is oxidized and functionalized by the oxidizer, such that hydrophilic groups such as hydroxy, alcohol, ketone, aldehyde, carboxylic acid, ether group are introduced to the CNT. Therefore, if the oxidizer is fed below 0.001 equivalents based on the carbon of the CNT, the CNT is not uniformly oxidized with the oxidizer to deteriorate the functionalized degree, such that the feeding of the functional group of the functional compound is very small and the dispersibility is also not improved, and if the oxidizer is fed above 10 equivalents, the functionalizing effect corresponding to the exceeded amount is not obtained, such that raw materials waste The mixture subjected to the preheating proceeds to functionalizing (S200).

b) In the preheater 110, the carbon nanotube mixture preheated obtained in step a) is transferred to a continuous functionalizing reactor 130, which performs the step of functionalizing carbon nanotube under the subcritical water or supercritical water condition of 50 to 400 atm. At this time, as the subcritical water or supercritical water condition, the temperature is preferably 100 to 600° C. Further, the functional compound is subjected to the feeding the functional compounds (S210) that is fed under a pressure of 50 to 400 atm and a temperature of 100 to 600° C. by a functional compound high-pressure feeding part 15, thereby making it possible to obtain the functionalized product. When the pressure for feeding the functional compound is below 50 atm, it is difficult to the functional compound into the reactor and if the pressure for feeding the functional compound is above 400 atm, the energy loss occurs due to too high pressure and the functionalized degree in view of functionalizing the CNT is not improved any more Herein, the functional compound of the present invention is fed at from a ⅕ point from an inlet to an outlet point of the functionalizing reactor under the subcritical water or supercritical water condition.

Preferably, after the preheated carbon nanotube mixture is fed into the functionalizing reactor 130, the feeding point of the functional compound is before it is transferred to the cooling down and depressurizing part 150 during functionalizing under the subcritical water or supercritical water condition. Preferably, the feeding of the functional compound is fed at from a ⅕ point from the inlet of the functionalizing reactor 130 to the outlet point thereof, and more preferably, at from a ⅗ point to a ⅘ point from the inlet. If the functional compound is fed before the ⅕ point, the carbon nanotube reacts with the oxidizer such that the introducing of the hydrophilic group is not insufficient, thereby degrading the activity of the carbon nanotube. As a result, it is difficult to introduce the functional group of the functional compound. On the other hand, if the functional compound is fed behind the outlet point, the reaction temperature is not insufficient, such that the introducing ratio of the functional group of the functional compound into the carbon nanotube is low. As a result, there is a risk of lowering the functionalized degree.

In the present invention, as the functional compound having one or more functional group, there is the functional compound having one or more functional group selected from a group consisting of carboxyl, carboxylate, amine, amine salt, tetravalent-amine, phosphoric acid group, phosphate, sulfuric acid group, sulfate, alcohol, thiol, ester, amide, epoxide, aldehyde, ketone, and a mixture thereof and more preferably, a group consisting of ammonia, ammonia water, octylamine, triethylamine, sodium dodecyl sulfate, thiourea, etc. The continuous method for functionalizing a carbon nanotube feeds the functional compounds as an amount of 0.001 to 10 times the oxidizer equivalent, and preferably, as an amount of 0.1 to 3 times. If the functional compound is fed below 0.01 times the oxidizer equivalent, the introducing of the functional group is very small due to the functional compound and if the functional compound is fed above 10 times, the functionalizing effect corresponding to the exceeded amount is not obtained, such that raw materials waste.

Meanwhile, as the subcritical water condition, the pressure is preferably 50 to 260 atm and more preferably 60 to 260 atm. Also, the temperature is preferably 100 to 380° C., and more preferably, 200 to 350° C. At this time, the treatment time is preferably progressed for 1 to 30 minutes and more preferably, for 5 to 15 minutes.

On the other hand, as the supercritical water condition, the pressure is preferably 150 to 400 atm and more preferably 210 to 300 atm. Also, the temperature is preferably 350 to 600° C., and more preferably, 370 to 500° C. At this time, the treatment time is preferably progressed for 1 to 30 minutes and more preferably, for 5 to 15 minutes.

The oxidizer is completely mixed with the CNT solution due to the above-mentioned subcritical water or supercritical water condition such that they are uniformly penetrated into CNT particles in which the oxidizer is agglomerated in a rapid time, thereby oxidizing the surface of the CNT at uniform concentration. Therefore, the penetration force of the oxidizer is excellent under the subcritical water or supercritical water condition, such that the oxidization reaction is more uniform and is progressed at high speed, thereby increasing the functionalizing effect.

The subcritical water or supercritical water condition is an selective condition for controlling a functionalized level, means that water is in the range of the above mentioned temperature or pressure conditions.

In particular, if the CNT is functionalized under the subcritical water condition, there is higher dispersibility in water or organic solvent.

Also, if CNT is functionalized under the supercritical water condition, there is the effect of functionalization similar to the effect of the functionalization under the subcritical water though the CNT is functionalized using a smaller amount of oxidizer than the amount of oxidizer used under the subcritical water.

c) The continuous method for functionalizing a carbon nanotube includes the cooling down and depressurizing (S300) that cools down and depressurizes the functionalized product into 0 to 100° C. and 1 to 10 atm and d) the product recovering (S400) that recovers the cooled down and depressurized product to obtain the functionalized product.

The heat source of the heat exchanger 14 installed at the front end of the preheater 110 and used for preheating the mixture is high-temperature product solution that is transferred from the functionalizing reactor 130 and functionalized, and the mixture is used to preheat the mixture and be also used to primarily cool down the product solution so that the product solution becomes 100 to 370° C., thereby making it possible to prevent the energy loss.

Describing in more detail, the functionalized product subjected to the functionalizing can be subjected to c) the cooling down and depressurizing S300 that cools down into 0 to 100° C. and depressurizes them into 1 to 10 atm.

The functionalized product is primarily cooled down by the heat exchanger 14 and subjected to the cooling down into 0 to 100° C. by a cooling down part 16. It is more preferable to adjust the cooling temperature into 20 to 50° C.

The cooled down product is transferred to the cooling down and depressurizing part 150 and can be subjected to the cooling down and depressurizing into 1 to 10 atm. The cooling down and depressurizing first maintains the cooled state of the product as it is, reduces the pressure into 10 to 100 atm by the capillary system in the cooling down and depressurizing part 150, and then finally depressurizes them into 1 to 10 atm by the pressure controlling system 17.

d) The products subjected to the cooling down and depressurizing can be finally subjected to the recovering the product in the product storing part 170. Therefore, the functionalized carbon nanotube solution of the present invention is completed, and then the product recovering step (S600) can be performed.

Further, the present invention provides the continuous method for functionalizing a carbon nanotube that further includes the filtering after the cooling down and depressurizing.

e) The products can be used in a solution state as it is, but can be recovered to be used as powders. In order to obtain the CNT in a power state, the continuous method for functionalizing a carbon nanotube further includes the filtering under high pressure after the functionalized product is cooled down in step c). Therefore, the functionalized and the cooled down and depressurized product is further subjected to the filtering (S310).

FIG. 3 is a process diagram of a continuous apparatus for functionalizing a carbon nanotube including a filter of a carbon nanotube according to an exemplary example of the present invention. Referring to FIG. 3, the apparatus may further include filtering parts 210 and 230 that are connected in parallel with high-pressure filters having a pore size of 0.001 to 10 μm and operated in a switching manner so as to filter the functionalized and cooled down product in the apparatus of FIG. 2. Filtrates 211 and 231 and functionalized CNT filtering products 213 and 233 are transferred to be separated from each other from the filtering parts 210 and 230 and the filtrates 211 and 231 are depressurized to normal pressure state by a filtering pressure controlling system 21, is transferred and discharged to a filtrate storing part 300. The filtering part can be installed in parallel in more than one according to required capacity.

In detail, when the functionalized CNT filtering product and the filtrate are separated from each other in the filtering parts 210 and 230 connected to each other in parallel, if the pressure is applied to the filtering part 210, a valve is closed and the filtering part 230 is opened to filter the functionalized and cooled down product and at the same time, the functionalized CNT filtering product 213 is recovered in the filtering part 210 and the filtrate 211 is transferred and discharged to the filtrate storing part 300.

As the same method as described above, if the pressure is applied to the filtering part 230, the valve is closed and the filtering part 210 is opened instead of the filtering part 230 to filter the continuously functionalized and cooled down product and to recover the functionalized CNT filtering product 233 in the filtering part 230 and a process of transferring and discharged the filtrate 231 to the filtrate storing part 300 is repeated to alternately filter the filtrate 231 in a switching manner, thereby functionalizing continuously.

Further, the present invention provides the continuous method for functionalizing a carbon nanotube that further includes the dispersing after the product recovering.

The continuous method for functionalizing a carbon nanotube may further include the dispersing (S410) the recovered products. The dispersing disperses the products, which are subjected to the product recovering, in the dispersion solvent selected from a group consisting of water, alcohol of (C1 to C20), ketone, amine, alkyl, halogen, ether, furan, solvent containing sulfur, and a mixture thereof. In detail, the dispersion solvent may be selected from a group consisting of water, acetone, methanol, ethanol, propanol, butanol, isopropanol, tetrahydrofuran, dimethylformamide, 1,2-dichloroethane, chloroform, methylenechloride, chlorobenzene, 1, 2,4-trichlorobenzene, 1-methyl-2-pyrrolidone, acetonitrile, pyridine, dimethylsuofoxide, nitrobenzene, hydrocarbons, ethers, and a mixture thereof.

The recovered product may be included as 0.00001 to 10 wt %. If the content of the recovered product is below 0.00001 wt %, it is difficult to estimate the improved effect of dispersibility due to the functionalizing and if the content of the recovered product is above 10 wt %, it is difficult to effectively disperse the recovered product due to increasing of the viscosity in the dispersion process.

Further, a method of the dispersing is selected a group consisting of ultrasonic wave, homogenizer, fluidizer, pulverizer, bead mil, and paint shaker.

In the present invention, the continuous apparatus for functionalizing a carbon nanotube includes, the preheater that preheats the carbon nanotube mixture and the oxidizer fed under a pressure of 50 to 400 atm; a functionalizing reactor 130 into which a functional compound is fed under a pressure of 50 to 400 atm and a temperature of 100 to 600° C. to the subcritical water or supercritical water condition of 50 to 400 atm in functionalizing the mixture to introducing the functional group of the functional compound; the cooling down and depressurizing part 150 that cools down the functionalized product obtained in the functionalizing reactor into 0 to 100° C. and depressurizes them into 1 to 10 atm; and the product storing part 170 that recovers the product obtained in the cooling down and depressurizing part. Further, the present invention includes the heat exchanger 14 at the front end of the preheater 110, wherein the non-preheated carbon nanotube mixture and the functionalized product can be heat-exchanged by the heat exchanger. The present invention provides the continuous method for functionalizing a carbon nanotube using the capillary system as the depressurizing apparatus in the cooling down and depressurizing part 150.

In addition, the present invention provides the continuous apparatus for functionalizing a carbon nanotube that further includes the filtering parts connected in parallel with the high-pressure filter having a pore size of 0.001 to 10 μm and operated in a switching manner so as to filter the functionalized product obtained in the functionalizing reactor 130. If the pore size of the high-pressure filter is below 0.001 μm, the functionalized carbon nanotube closes up the pore of the filter such that there the energy load may be increased and if the pore size of the high-pressure filter is above 10 μm, the filtering effect disappears, such that the particle size of the carbon nanotube powder may not be uniformly recovered.

The present invention provides a continuously functionalized carbon nanotube according to the above-mentioned method. Therefore, the continuously functionalized carbon nanotube is provided so that the functionalized level of the functionalized carbon nanotube is $0.010 \leq A_D/A_G \leq 0.50$ by a Raman spectroscopy and is $0.1 \leq O_{1s}$, atom $\% \leq 30.0$ atom $\%$ or $0 \leq N_{1s}$, atom $\% \leq 30$ atom $\%$ by an XPS.

As described above, the continuous method for functionalizing a carbon nanotube of the present invention is not harmful under the subcritical water or supercritical water condition, uses the oxidizer that can be easily handled and can easily treat waste water therefrom, and functionalizes the carbon nanotube by the continuous apparatus to shorten the preparing process.

Further, if the functional compound is fed during the continuous subcritical or supercritical process, the functional group of the functional compound is easily introduced to the carbon nanotube to increase the functionalizing effect of the carbon nanotube, such that the dispersibility is increased. In addition, the applicability of the CNT can be expanded due to the introducing of the functional group.

Moreover, the carbon nanotube of the present invention can be obtained in a solution state or a powder state by the continuous apparatus according to the application.

DETAILED DESCRIPTION OF MAIN ELEMENTS

Figure 1:
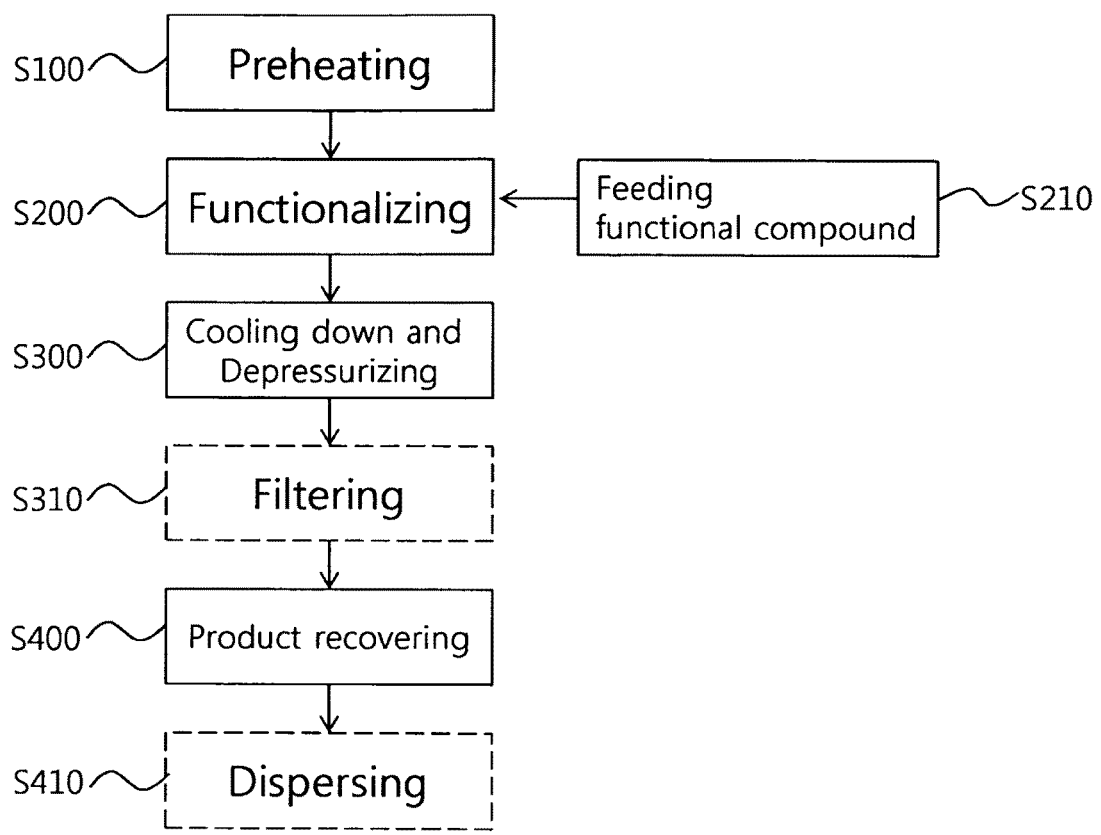
FIG. 1 is a diagram showing a process for a continuously functionalizing a carbon nanotube according to an exemplary example of the present invention.
Figure 2:
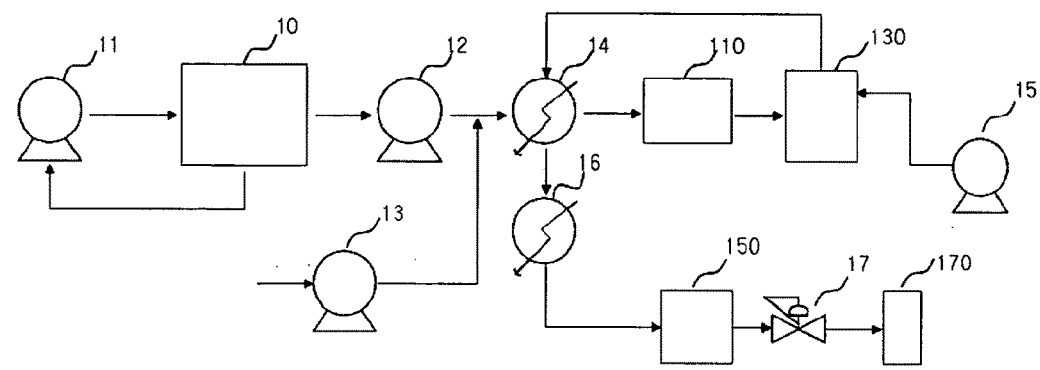
FIG. 2 is a process diagram of a continuous apparatus for functionalizing a carbon nanotube according to an exemplary example of the present invention.

10: PRE-TREATING PART
11: CIRCULATION PUMP
12: CNT SOLUTION HIGH-PRESSURE FEEDING PUMP
13: OXIDIZER HIGH-PRESSURE FEEDING PUMP
14: HEAT EXCHANGER
15: FUNCTIONAL COMPOUND HIGH-PRESSURE FEEDING PUMP
16: COOLING DOWN PART
17: PRESSURE CONTROLLING SYSTEM
21: FILTERING PRESSURE CONTROLLING SYSTEM
110: PREHEATER
130: FUNCTIONALIZING REACTOR
150: COOLING DOWN AND DEPRESSURIZING PART
170: PRODUCT STORING PART
210, 230: FILTERING PARTS
211, 231: FILTRATE
213, 233: FUNCTIONALIZED CNT FILTERING PRODUCT
300: FILTRATE STORING PART

BEST MODE FOR CARRYING OUT THE INVENTION

The present invention will be described in detail with reference to the following examples.

EXAMPLE 1

Multi-walled CNT of 10 g and distilled water of 990 g were mixed with a circulation pump 11 and a CNT solution was prepared in the pre-treating part 10. Before the CNT solution was fed into the preheater 100 at a flow rate of 30 g/min by the CNT high-pressure feeding pump 12, oxygen in a gas state compressed at 245 to 252 atm was mixed with the CNT solution at a flow rate of 0.8 g/min at the front end of the heat exchanger 14 and the mixture was fed into the preheater 100 preheated into 200 to 260° C. by the heat exchanger 14.

The preheated mixture was fed and functionalized into the functionalizing reactor 130 under the subcritical water condition of a temperature of 300 to 360° C. and 230 to 250 atm and the functionalized product was transferred to the heat exchanger 14 and primarily cooled down to 200° C., and then was cooled down again to a temperature of about 25° C. by the cooling down part 16, such that the continuously functionalized product of 9.8 g was obtained.

EXAMPLE 2

Product of 9.2 g functionalized in the same manner as Example 1 was obtained except that oxygen, which is oxidizer, was mixed with the CNT solution at a flow rate of 0.4 g/min, when preheating the mixture of the CNT solution and the oxidizer, the temperature of the heat exchanger 14 is 350 to 370° C., and the mixture was reacted and functionalized under the subcritical water condition of 400 to 450° C. and 230 to 250 atm.

EXAMPLE 3

Product of 18.6 g was obtained in the same manner as Example 1 except that 20 g of multi-walled CNT and 980 g of distilled water were mixed with the circulation pump 11 and the CNT solution was prepared in the pre-treating part 10.

EXAMPLE 4

Product of 9.6 g was obtained with the same functionalizing manner as Example 1 except that air was used instead of oxygen as the oxidizer.

EXAMPLE 5

Product of 9.7 g was obtained with the same functionalizing manner as Example 2 except that air was used instead of oxygen as the oxidizer.

EXAMPLE 6

Product of 9.1 g was obtained with the same functionalizing manner as Example 1 except that ozone was used instead of oxygen as the oxidizer.

EXAMPLE 7

Product of 9.2 g was obtained with the same functionalizing manner as Example 2 except that air was used instead of oxygen as the oxidizer.

EXAMPLE 8

Product of 8.7 g was obtained with the same functionalizing manner as Example 1 except that 50% hydrogen peroxide aqueous solution of 108.8 g (1.6M) was used instead of oxygen as the oxidizer.

EXAMPLE 9

Product of 9.0 g was obtained with the same functionalizing manner as Example 2 except that 50% hydrogen peroxide aqueous solution of 108.8 g (1.6M) was used instead of oxygen as the oxidizer.

EXAMPLE 10

Product of 8.3 g was obtained with the same functionalizing manner as Example 1 except that nitric acid instead of oxygen as oxidizer was used, but when preparing the CNT solution, nitric acid of 25.2 g (0.4M) was added in the preheating part 10 while putting multi-walled CNT of 10 g in distilled water of 964.8 g and then agitating them to prepare the CNT and nitric acid solution, such that the mixture was prepared.

EXAMPLE 11

Product of 8.1 g was obtained with the same functionalizing manner as Example 2 except that nitric acid instead of oxygen as oxidizer was used, but when preparing the CNT solution, nitric acid of 25.2 g (0.4M) was added in the preheating part 10 while putting multi-walled CNT of 10 g in distilled water of 964.8 g and then agitating them to prepare the CNT and nitric acid solution, such that the mixture was prepared.

EXAMPLE 12

The functionalized product was cooled down in the same manner as Example 1 and the functionalized CNT filtering product and filtrate were then separated from each other in the filtering parts 210 and 230 connected in parallel with the high-pressure filter having a pore size of 0.001 to 10 μm to recover the functionalized CNT filtering product, such that the continuously functionalized product of 9.5 g was obtained.

EXAMPLE 13

The functionalized product was cooled down in the same manner as Example 2 and the functionalized CNT filtering product and filtrate were then separated from each other in the filtering parts 210 and 230 connected in parallel with the high-pressure filter having a pore size of 0.001 to 10 μm to recover the functionalized CNT filtering product, such that the continuously functionalized product of 8.8 g was obtained.

EXAMPLE 14

The functionalized product of 9.8 g was obtained in the same manner as Example 1 except that ammonia water was fed under a pressure of 230 to 250 atm that is high pressure, a temperature of 300 to 350° C., and at a flow rate of 0.20 g/min at a 4/5 point from the inlet of the functionalizing reactor during the functionalizing reaction under the subcritical water condition of 350° C. and 230 to 250 atm.

EXAMPLE 15

The functionalized product of 9.8 g was obtained in the same manner as Example 2 except that ammonia water was fed under a pressure of 230 to 250 atm that is high pressure, a temperature of 400 to 400° C., and at a flow rate of 0.20 g/min at a 4/5 point from the inlet of the functionalizing reactor during the functionalizing reaction under the supercritical water condition of a temperature of 450° C. and 230 to 250 atm.

EXAMPLE 16

While multi-walled carbon nanotube of 10 g and distilled water of 977.8 g were put and then agitated, nitromethane of 12.2 g (0.2M) was added thereto and they were circulated by the circulation pump 11, such that the CNT solution including the nitro compound was prepared. Before, the CNT solution is fed into the preheater 110 at a flow rate of 30 g/min by the CNT solution high-pressure feeding pump 12, oxygen in a gas state compressed at 245 to 252 atm and the CNT mixture mixed with the CTN solution at a flow rate of 0.4 g/min at the front end of the heat exchanger are preheated to a temperature of 220 to 260° C. by the heat exchanger 14.

The preheated CNT mixture was fed into the functionalizing reactor 130 under a subcritical water condition of a temperature of 330 to 360° C. and 230 to 250 atm and oxygen reacted with the nitromethane in the CNT mixture, such that the CNT mixture was functionalized while instantly forming nitric acid by passing through the reaction path of a reaction formula 1.

$$NO_2CH_3 + 2O_2 \longrightarrow HNO_3 + CO_2 + H_2O \quad \text{[Reaction Formula 1]}$$

The continuously functionalized product of 9.0 g was obtained in the same manner as Example 1 except that while the functionalizing reaction was progressed, ammonia water was fed under a pressure of 230 to 250 atm, a temperature of 350° C., and at a flow rate of 0.20 g/min at a 4/5 point from the inlet of the functionalizing reactor.

EXAMPLE 17

The product of 8.9 g functionalized in the same manner as Example 16 except that the preheating was performed to 350 to 370° C., the functionalizing was performed under the supercritical water condition of a temperature of 400 to 450° C. and a pressure of 230 to 25 am.

EXAMPLE 18

Figure 3:
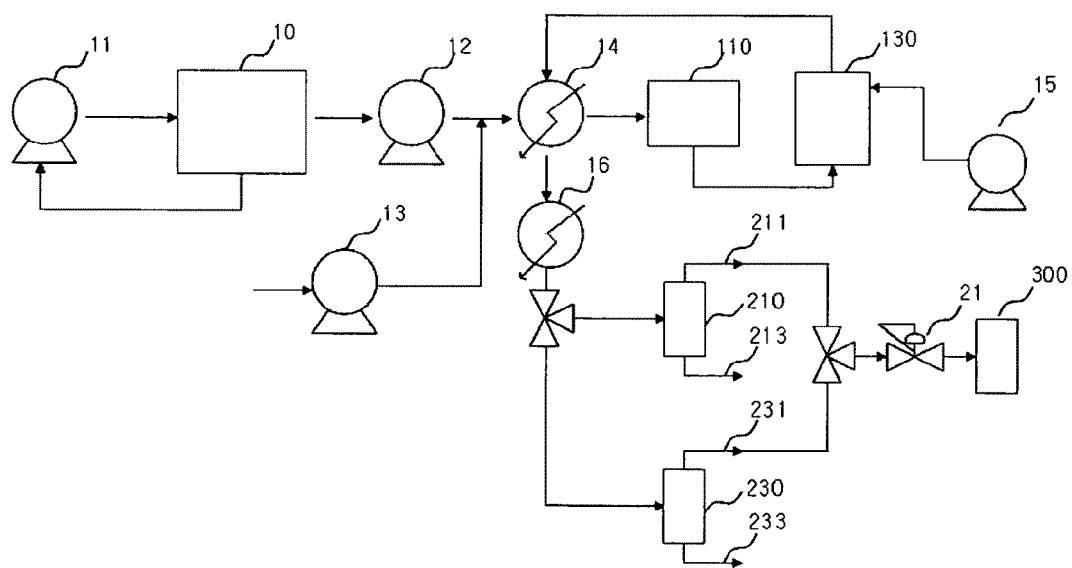
FIG. 3 is a process diagram of a continuous apparatus for functionalizing a carbon nanotube including a filter of a carbon nanotube according to an exemplary example of the present invention.

After the functionalizing was performed in the same manner as Example 14, the filtering was performed by using the continuous functionalizing apparatus including the filtering parts of FIG. 3 and the high-pressure filter having a pore size of 0.001 to 10 μm, such that the functionalized CNT product of 9.0 g was obtained.

COMPARATIVE EXAMPLE 1

The reaction was performed in the same manner as Example 1 without feeding oxidizer.

COMPARATIVE EXAMPLE 2

The reaction was performed in the same manner as Example 2 without feeding oxidizer.

*Test Method
1. Infrared Spectroscopy (FT-IR Spectroscopy)

It used Model No. 4100 by Varian Co. and performed the measurement by mixing a sample for analysis with potassium bromide (KBr) powder, uniformly agitating in pestle porcelain, and then, preparing pellet.

Figure 4:
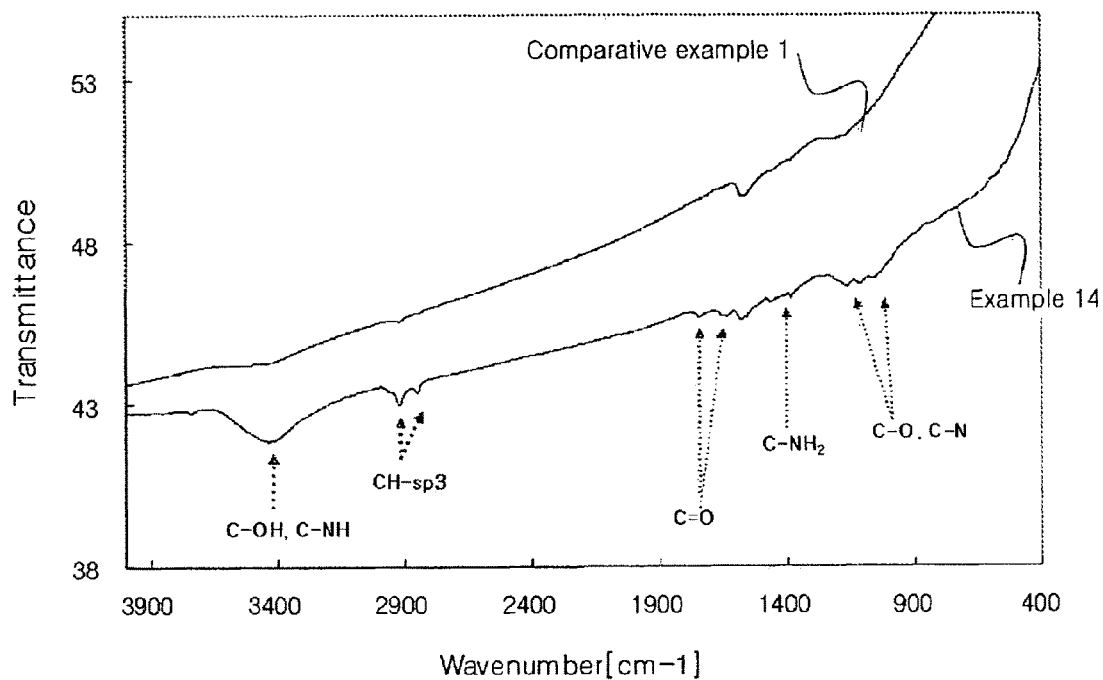
FIG. 4 is a diagram showing an infrared spectroscopy result of a functionalized carbon nanotube according to Example 14 and Comparative Example 1 of the present invention.

FIG. 4 is a diagram showing an infrared spectroscopy result of a functionalized carbon nanotube according to Example 14 and Comparative Example 1 of the present invention. Referring to FIG. 4, it can be confirmed that the peak of the functionalized functional group exhibits compared to Comparative Example 1 the functionalization is done. The functionalized structure obtained from the measurement result is a hydroxy group, an alcohol group, a carboxylic acid group, a ketone group, an ether group, a CH-sp3 group, an amine group, and an amide group.

2. Raman Spectroscopy

As LabRam HR model by Jobin-Yvon Co., an apparatus using a 800 nm focal length monochromator and a light source having argon ion laser 514.532 nm wavelength was used. As the sample, powders obtained by drying moisture in a vacuum drying oven, were used.

Figure 5:
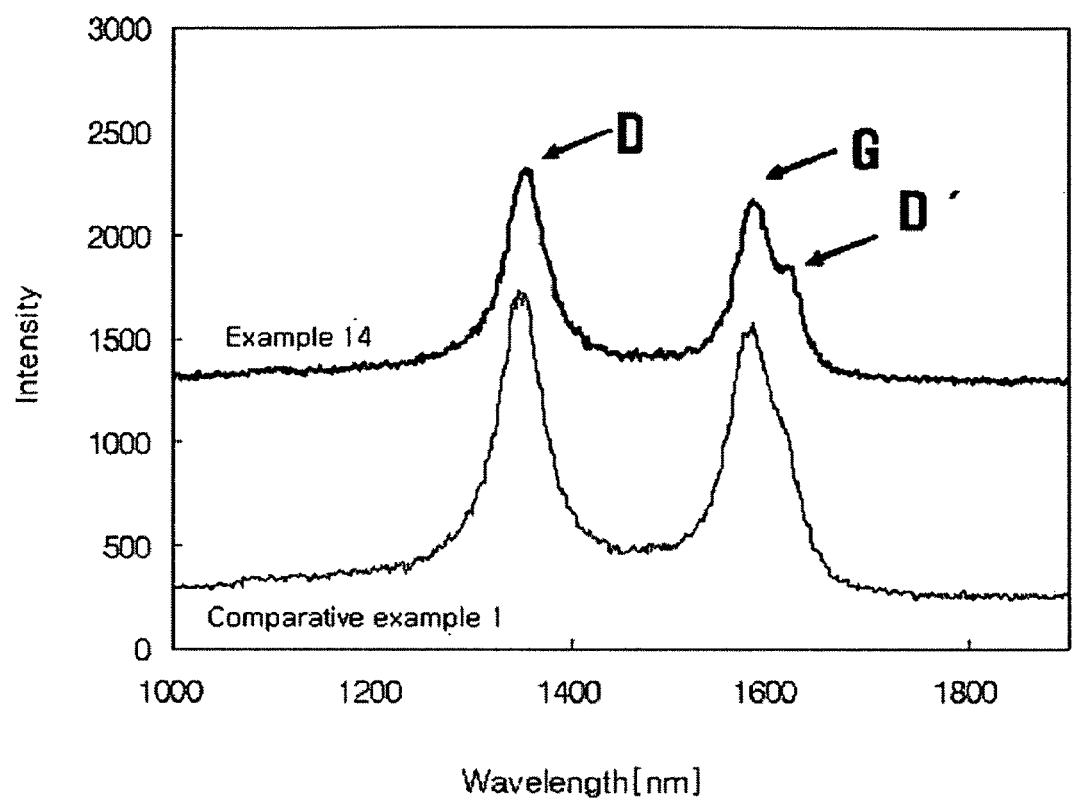
FIG. 5 is a diagram showing a Raman spectrum result of a functionalized carbon nanotube according to Example 14 and Comparative Example 1 of the present invention.

FIG. 5 is a diagram showing a Raman spectrum result of a functionalized carbon nanotube according to Example 14 and Comparative Example 1 of the present invention. Referring to FIG. 5, it can be confirmed that a peak change of Example 14 exhibits near (G peak) 1580 cm$^{-1}$ compared to Comparative Example 1 and thus, a surface is oxidized. The changed peak exhibits at 1620 cm$^{-1}$ peak (D' peak). The ratio of the 1580 cm$^{-1}$ peak to the changed 1620 cm$^{-1}$ peak [R=D' peak area (A$_{D'}$)/G peak area (A$_G$)] was calculated through Raman spectrum to estimate the level of the CNT functionalization.

3. Transmission Electron Microscope (TEM)

It used Model No. JEM-2100F (HR) by JEOL Co. and measured on a grid in a holic type.

Figure 6A:
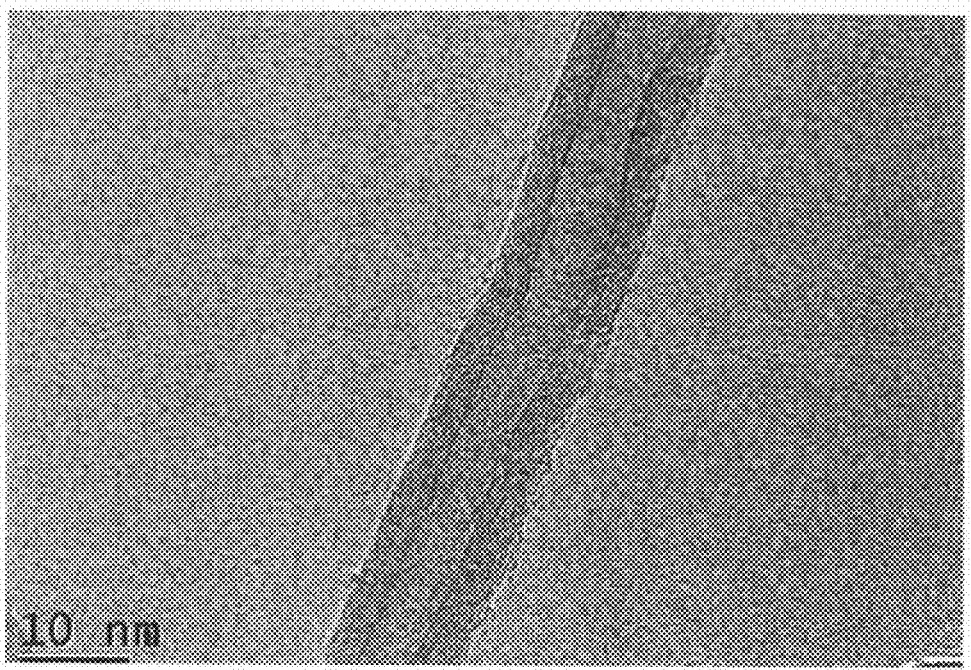
FIG. 6a is a transmission electron microscope (TEM) photograph of the functionalized carbon nanotube according to Comparative Example 1.
Figure 6B:
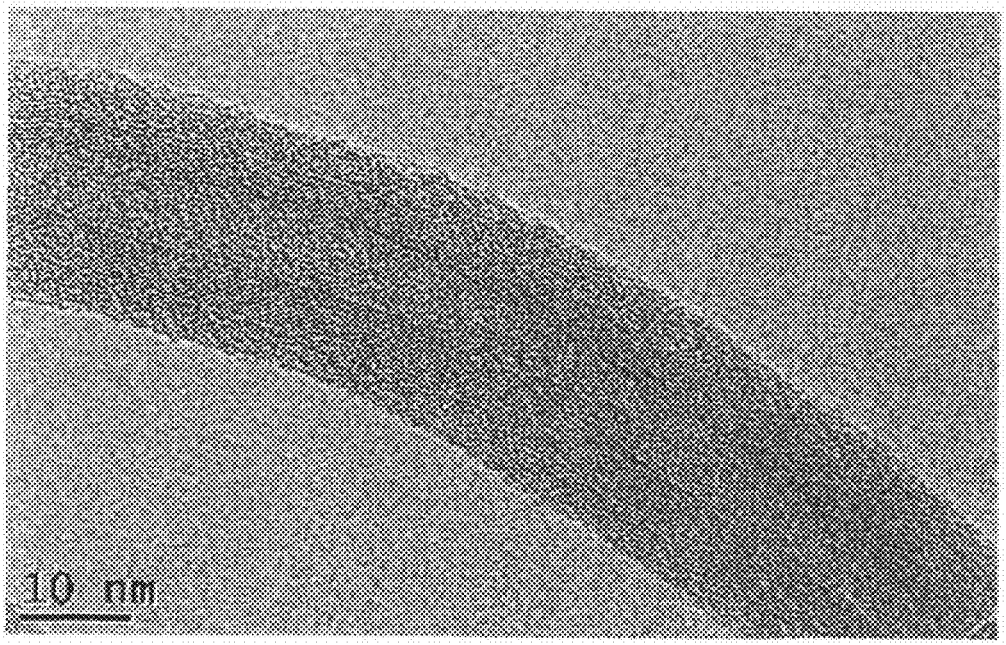
FIG. 6b is a transmission electron microscope (TEM) photograph of the functionalized carbon nanotube according to Example 14.

FIG. 6a is a transmission electron microscope (TEM) photograph of the functionalized carbon nanotube according to Comparative Example 1 and FIG. 6b is a transmission electron microscope (TEM) photograph of the functionalized carbon nanotube according to Example 14. As can be appreciated from the results of FIGS. 6a and 6b, it can be confirmed that the border line of the functionalized carbon nanotube wall of FIG. 6b was obscure as compared to FIG. 6a and thus, the functionalization was done.

4. Dispersion State

It is a state where the functionalized carbon nanotube of 0.2 g according to Example 1 of the present invention was dispersed into water of 99.8 g. In addition to the above water, the dispersion state in organic solvent was good.

Figure 7:
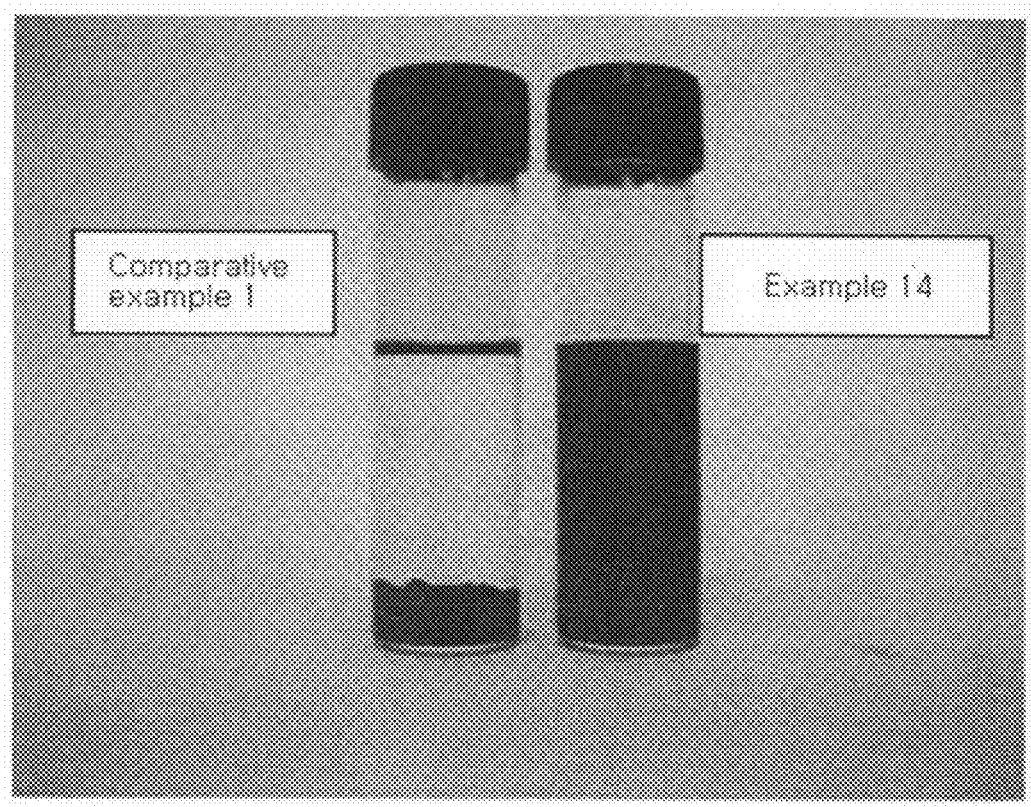
FIG. 7 is a diagram showing a dispersion state of water of a functionalized carbon nanotube according to Example 14 and Comparative Example 1 of the present invention.

FIG. 7 is a diagram showing a dispersion state of water of a functionalized carbon nanotube according to Example 14 and Comparative Example 1 of the present invention. Referring to FIG. 7, no dispersion effect exhibits in Comparative Example 1 and the CNT was sunk and thus, separated from water, but in the case of Example 14, the CNT was not sunk and uniformly dispersed into water. As a result, it can be confirmed that the dispersion state is improved due to the functionalizing.

5. X-ray Photoelectron Spectroscopy (XPS)

It measured using Model No. ESCALAB 250 by VG Scientifics Co. As the sample, powders obtained by drying moisture in a vacuum drying oven.

Figure 8:
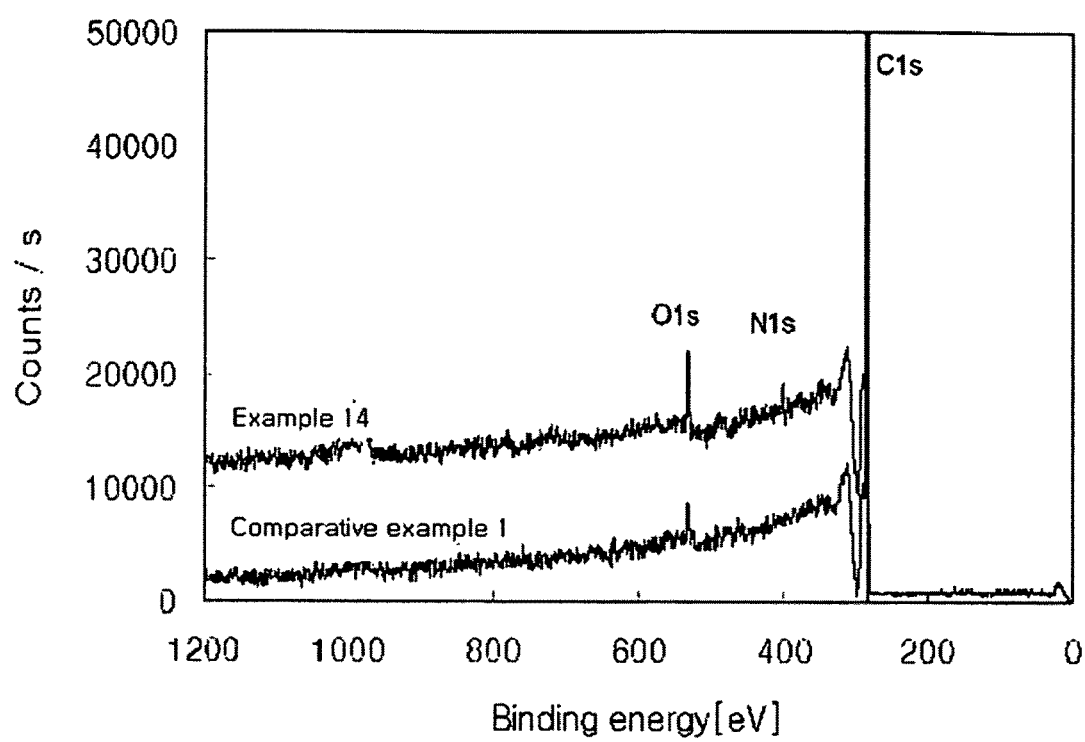
FIG. 8 is a diagram showing an X-ray photoelectron spectroscopy (XPS) result of a functionalized carbon nanotube according to Example 14 and Comparative Example 1 of the present invention.

FIG. 8 is a diagram showing an X-ray photoelectron spectroscopy (XPS) result of a functionalized carbon nanotube according to Example 14 and Comparative Example 1 of the present invention. Referring to FIG. 8, it can be confirmed that a peak very frequently exhibited near binding energy of 564 eV and 40 eV as compared to Comparative Example 1 and thus, the functionalized oxidization effect of the CNT was obtained. It can estimate the level of the functionalized CNT by using a relative content of peaks of carbon, oxygen, and nitrogen observed by the XPS.

TABLE 1

| Division | Oxidizer | RAMAN (A$_D$/A$_G$) | XPS (O$_{1S}$, atom %) | XPS (N$_{1S}$, atom %) |
| --- | --- | --- | --- | --- |
| Example 1 | O$_2$ | 0.229 | 5.72 | — |
| Example 2 | O$_2$ | 0.235 | 6.17 | — |
| Example 3 | O$_2$ | 0.212 | 5.32 | — |
| Example 4 | Air | 0.146 | 4.51 | — |
| Example 5 | Air | 0.194 | 4.74 | — |
| Example 6 | Ozone | 0.153 | 5.58 | — |
| Example 7 | Ozone | 0.214 | 4.82 | — |
| Example 8 | Hydrogen Peroxide | 0.175 | 4.72 | — |
| Example 9 | Hydrogen Peroxide | 0.171 | 5.52 | — |
| Example 10 | Nitric Acid | 0.158 | 9.69 | 1.48 |
| Example 11 | Nitric Acid | 0.235 | 8.89 | 2.19 |
| Example 12 | O$_2$ | 0.230 | 5.73 | — |
| Example 13 | O$_2$ | 0.237 | 6.16 | — |
| Example 14 | O$_2$ Ammonia | 0.179 | 4.47 | 2.44 |
| Example 15 | O$_2$ Ammonia | 0.201 | 3.49 | 2.00 |
| Example 16 | Nitromethane Ammonia | 0.252 | 12.73 | 0.34 |
| Example 17 | Nitromethane Ammonia | 0.215 | 8.90 | 0.20 |
| Example 18 | O$_2$ Ammonia | 0.180 | 4.42 | 2.49 |

Table 1 indicates numerical values for the results shown in FIGS. 5 and 8. It can be confirmed that the level of the functionalized carbon nanotube was measured in the range of $0.01 \leq A_D/A_G \leq 0.50$ by the Raman spectroscopy and $0.1 \leq O_{1s}$, atom % $\leq 30$ atom %, $0 \leq N_{1s}$, atom % $\leq 30$ atom % by the XPS.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A continuous method for functionalizing a carbon nanotube, comprising: a) feeding an oxidizer into a preheater while feeding a carbon nanotube solution including carbon nanotube and solvent into the preheater via a heat exchanger to produce a carbon nanotube mixture of the carbon nanotube solution and the oxidizer and then preheating the resultant carbon nanotube mixture at 200 to 370° C;

b) feeding the carbon nanotube mixture from the step (a) into a functionalizing reactor at a subcritical water condition of 50 to 400 atm and then feeding a compound having one or more functional group selected from a group consisting of carboxyl, carboxylate, amine, amine salt, tetravalent-amine, phosphoric acid group, phosphate, sulfuric acid group, sulfate, thiol, ester, amide, epoxide, aldehyde, ketone and a mixture thereof into the functionalizing reactor to obtain a functionalized product;

c) cooling down the functionalized product from the step (b) into 0 to 100° C. and depressurizing the functionalized product into 1 to 10 atm by feeding the functionalized product into a cooling down and depressurizing part via the heat exchanger of the step (a) while carrying out the process of the step (a); and d) recovering the cooled down and depressurized product.

2. The continuous method for functionalizing a carbon nanotube according to claim 1, wherein the compound used in step (b) is fed as an amount of 0.001 to 10 times with respect to an equivalent weight of the oxidizer.

3. The continuous method for functionalizing a carbon nanotube according to claim 1, wherein the compound used in step (b) is fed at a ⅓ point from an inlet to an outlet point of the functionalizing reactor.

4. The continuous method for functionalizing a carbon nanotube according to claim 1, wherein the carbon nanotube is selected from a group consisting of single-walled, double-walled, multi-walled, roped, and a mixture thereof.

5. The continuous method for functionalizing a carbon nanotube according to claim 1, wherein the solvent used in step (a) is selected from a group consisting of water, aliphatic alcohol of C1 to C20, carbon dioxide, and a mixture thereof.

6. The continuous method for functionalizing a carbon nanotube according to claim 1, wherein the carbon nanotube solution further includes nitro compound of Chemical Formula 1:

R—(NO$_x$)$_y$     [Chemical Formula 1]

wherein Chemical Formula 1, R is alkyl group of C1 to C7 or aryl group of C6 to C20 and x and y are integers of 1 to 3 independently.

7. The continuous method for functionalizing a carbon nanotube according to claim 1, wherein the oxidizer is selected from oxygen, air, ozone, hydrogen peroxide, nitric acid, nitro compound, nitric acid forming oxidizer, and a mixture thereof.

* * * * *